Feb. 6, 1968 W. A. BOWEN, JR 3,367,607
BORESIGHT AXIS DISCRIMINATOR
Filed Oct. 19, 1960 3 Sheets-Sheet 1

INVENTOR.
WILLIAM A. BOWEN JR.
BY
*George J. Rebers*
ATTORNEY

Feb. 6, 1968  W. A. BOWEN, JR  3,367,607
BORESIGHT AXIS DISCRIMINATOR
Filed Oct. 19, 1960  3 Sheets-Sheet 2

(a)

(b)

(a)

(b)

(a)

(b)

INVENTOR.
WILLIAM A. BOWEN JR.
BY
*George J. Rubens*
ATTORNEY

INVENTOR.
WILLIAM A. BOWEN JR.

United States Patent Office 3,367,607
Patented Feb. 6, 1968

3,367,607
BORESIGHT AXIS DISCRIMINATOR
William A. Bowen, Jr., 225 E. Guava St.,
Oxnard, Calif. 93030
Filed Oct. 19, 1960, Ser. No. 63,698
14 Claims. (Cl. 244—3.16)

The invention described herein may be manufactured and used by or for the Government of the United States of America for governmental purposes without payment of any royalties thereon or therefor.

The present invention relates to an improved boresight axis discriminator and more particularly to an improved discriminator which determines the degree that a target source is laterally offset from a predetermined boresight axis. Up to the present time infrared guidance systems have use collectors which focus radiant energy from a target source to a point focus so that a variation of the point from a longitudinal axis of a vehicle will indicate the position of the target with respect to the axis. Systems employing a point image under present standards require a highly resolved image of low distortion, thus requiring that the collectors be made from the central portions of reflectors or lenses. Further, because of the highly resolved image requirement it is a further requirement that transparent domes or windows be mounted at the forward end of the vehicle. These domes or windows are subject to degradation due to high mach stagnation temperatures. This heating leads to self emission of the surfaces that adds to the noise background. Also the transmission losses in available window and dome materials unduly limits the sensitivity of the system. The present invention overcomes these difficulties by employing a unique type of collector which collects radiant energy from a target source and focuses this energy to a ring. By so focusing radiant energy from target source there no longer exists the requirement of a highly resolved image of low distortion since the ring shape per se enables modulations approaching 100% for chosen angles of the target off the boresight axis. Of particular importance it is to be noted that the ring focus opens many additional possibilities of unique modulation patterns that cannot be obtained with a point focus.

Accordingly, the present invention contemplates various shaped choppers which will serve this purpose by modulation of the incoming target beam. In order to obtain a ring focus the preferred embodiment of the present invenvention employs a ring-shaped collector having a concave reflecting surface which is parabolic in cross section It is of course to be understood that since a highly resolved image is no longer required that the collector may take many simple concave shapes other than parabolic. For the preferred embodiment it can generally be stated that the surface conforms to one generated by a sector of a parabola rotated about a boresight axis (which may be a longitudinal axis of a guided vehicle) with the principal axis of the parabola parallel to rays to be received by the collector from a target on the boresight axis. The invention also contemplates several unique modulators that will give a high percentage modulation upon a very slight lateral offset of the target from the boresight axis and other modulators which will give a high percentage of modulation when the lateral offset is a particular amount from the axis. Regardless of the type of chopper employed, the modulated rays that pass the chopper will be converted into usable electric signals by a photo or thermal sensor such as a lead sulphide cell. These electrical signals will represent in phase and amplitude respectively of the angle and the distance of the target with respect to the boresight axis. By comparing the phase signal from the sensor with a known phase signal and obtaining the angular difference between the two, the signal difference can be amplified and utilized by an actuator for driving control vanes of a vehicle body.

An object of the present invention is to provide a boresight axis discriminator which will operate effectively with lower quality optical components.

Another object is to provide a discriminator which will determine the position of a target with greater sensitivity.

A further object is to provide a discriminator which will be more compatible with high mach aerodynamic configurations.

A further object is to provide a collector which will focus rays of radiant energy from a target into a ring rather than a point image.

Still another object is to provide a chopper which will modulate up to one hundred percent the rays focused to a ring image when the rays are at a predetermined deviation from the boresight axis.

Other objects and many of the attendant advantages of this invention will be readily appreciated as the same become better understood by reference to the following detailed description when considered in connection with the accompanying drawings wherein.

Figure 1:
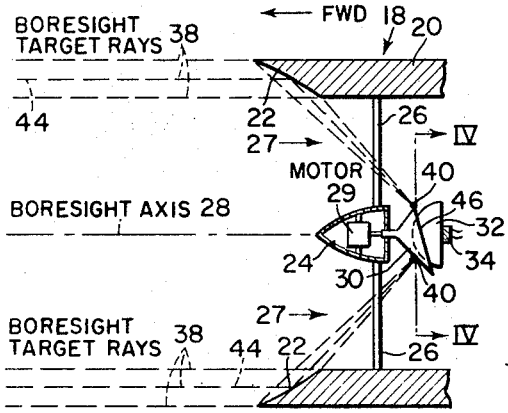
FIG. 1 shows a side view, partly in cross section, of an embodiment of the present invention in a ram-jet type of vehicle with a target on the boresight axis.

Referring now to the drawings wherein like reference numerals designate like or corresponding parts throughout the several views there is shown in FIG. 1 a forward portion of a ram-jet missile 18 comprising a body 20 the body having a forward annular collector surface 22. A nose cone 24 is mounted by a spider type brace 26 in spaced relationship with the body 20 so as to define a ram air inlet 27 and is axially aligned with the longitudinal axis of the missile, the latter axis coinciding with a boresight axis 28 of the discriminator to be described. The nose cone 24 houses a motor 29 and the motor is connected by its shaft to a conical shaped chopper 30 so that the chopper will rotate about the boresight axis 28. Just aft of the chopper is located a field lens 32 (i.e., a lens having a high index of refraction) for concentrating and/or smearing rays of radiant energy prior to falling upon a photo or thermal sensor 34. Radiant energy from a target source (not shown) which is aligned on the boresight axis will strike the collector 22 along boresight target rays 38. These target rays are reflected by the collector to a ring focus 40, this ring focus impinging upon an outer surface of the chopper. The chopper's outer surface is conical in shape and the chopper is aligned so that a principal axis of this conical surface coincides with the boresight axis 36.

Figure 3:
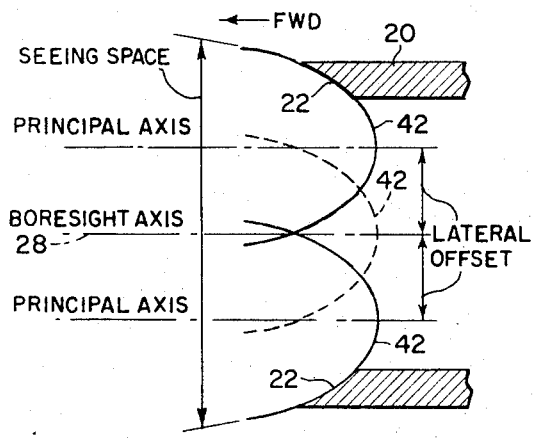
FIG. 3 shows how the collecting surface of FIGS. 1 and 2 is generated.

The principle of the collector 22 is illustrated in FIG. 3 wherein the collector's surface is generated by the rotation of a parabola 42 about the boresight axis 28 with the principal axis of the parabola laterally offset as shown in FIG. 3 by a predetermined amount. It is this lateral offset that results in the collector producing the ring focus 40. Accordingly, the outer extremities and extensions of the parabola located in FIG. 3 determines the seeing space which is located forward of the vehicle body. A target which is located within this seeing space and which is aligned on the boresight axis will produce a ring focus as seen in FIG. 1.

Figure 2:
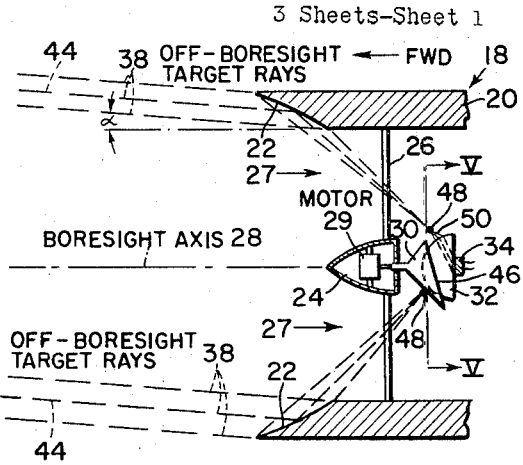
FIG. 2 shows the embodiment of FIG. 1 with a target laterally offset from the boresight axis.
Figure 4:
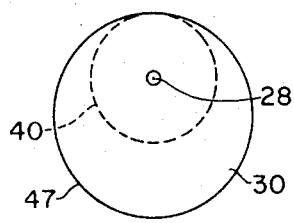
FIG. 4 shows the chopper and ring focus as taken along line IV—IV of FIG. 1.
Figure 5:
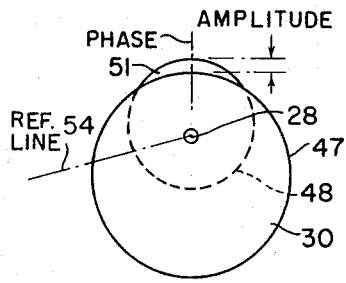
FIG. 5 shows the chopper and ring focus as taken along line V—V of FIG. 2.
Figure 6:
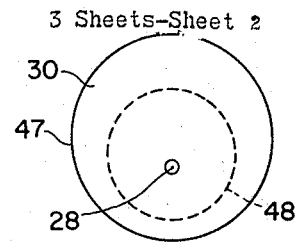
FIG. 6 is a modified view of FIG. 5 in that the chopper has rotated 180°.

The outer conical surface of the chopper is at an angle to the boresight axis so as to receive a principal beam of rays 44 normal to said surface. The chopper has a base 46 lying in a plane which is at an angle to a transverse plane of the missile body 20 and as seen in FIGS. 1 and 4, this base defines a chopping edge with respect to the ring focus 40. With respect to a ring focus for an on boresight target, as shown in FIG. 1, one point on the base 46 coincides with one point on the ring focus 40, all other points along the base falling aft of the ring focus and further away from the boresight axis than all other points along the ring focus. An on boresight axis target as shown in FIG. 4 illustrates that the ring focus will be entirely occluded so that no rays will impinge upon the sensor 34. However, when a target is laterally offset from the boresight axis by some angle $\alpha$ the rays of radiant energy from the target will strike the collector surface 22 as shown in FIG. 2. The rays are reflected by the collector 22 into an off boresight ring focus 48, this ring lying in a plane which is tilted with respect to a transverse plane of the missile body and which is shifted with respect to the boresight axis. The chopper 30 upon rotation by the motor 29 will then produce a modulated beam 50. The shift of the off boresight ring focus from the boresight axis allows a portion 51 of the focal ring to pass the modulator 30 to the sensor. This portion is illustrated in FIG. 5 wherein it is shown that the middle of said portion will represent the phase of the sensor output with respect to some reference line 54. As shown in FIG. 6 the chopper 30 has rotated about its axis 180° completely occluding the off boresight ring focus illustrating that for target rays at the angle $\alpha$ to the boresight axis this type of chopper will produce a modulation of said rays.

Figure 7:
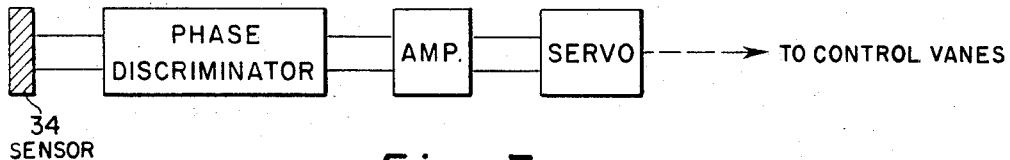
FIG. 7 shows the electrical components that can be employed for the embodiment of FIG. 1 after the sensor stage.

The sensor 34 may be any suitable photo or thermal such as one made of lead sulphide. Although it is not intended to be part of this invention a suitable electric circuit following the sensor stage is shown in FIG. 7. An electric output from the sensor would be fed into a phase discriminator wherein the phase of an off boresight ring focus would be determined with respect to the reference line 54 after which the resulting signal or signals would be sent to an amplifier. In turn the amplifier would energize the proper servo or servos to deflect the missile's control vanes until the boresight axis is aligned on the target.

Figure 8:
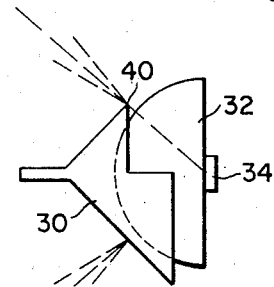
FIGS. 8 through 12 illustrate various types of choppers that can be employed in the embodiment of the invention in FIG. 1.
Figure 9:
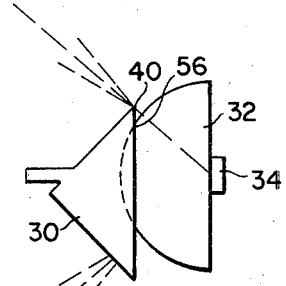
Figure 10:
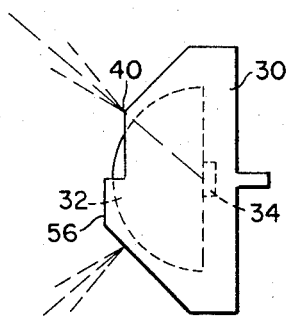
Figure 11:
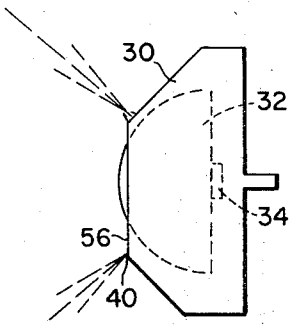
Figure 12:
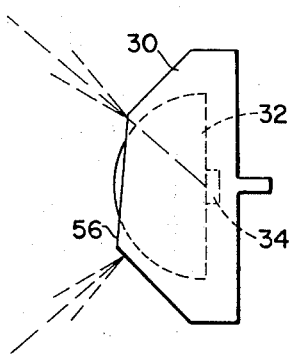

FIGS. 8 through 12 illustrate modifications of the chopper 30. Each of these modified choppers has in common (1) the principal axis of the outer conical surface of each is aligned parallel with the boresight axis; (2) the conical surface converges toward the target; (3) the conical surface intersects the entire periphery of an on-boresight axis target ring and is sloped so that the surface is normal to the principal beam of rays forming the ring; (4) the conical surface of the chopper has a portion which extends beyond an on-boresight axis target ring so that this portion forms a chopping edge; and (5) the remainder of the chopping edge has at least one point which coincides with one point of the on-boresight axis target ring. The modified choppers shown in FIGS. 8, 10 and 12 are aligned so that the principal axis of the outer conical surface of each coincides with the boresight axis 28 whereas the modified choppers as shown in FIGS. 9 and 11 are aligned so that the principal axis of their conical surface is laterally offset from the boresight axis. The modified choppers as shown in FIGS. 10, 11 and 12 are further distinguished in that each has a converging end 56 forming the chopping edge of the chopper, whereas the choppers shown in FIGS. 8 and 9 each has a diverging end forming the chopping edge.

The field lens 32 having a spherical surface is of such a size so as to receive a principal beam of rays from an on-boresight target at an angle normal thereto. The sensor 34 can be attached to the center of the field lens as shown in FIGS. 8 through 12 or the detector may be imbedded within the field lens itself. In order to conserve the radiant energy a light pipe may be attached contiguous to the after portion of the field lens.

It is to be noted that the system as described has been based upon a phase modulation of the ring focus. Returning to FIG. 5 it will be seen that an off-boresight axis target will result in a focal ring which has phase and amplitude. The angle of the center of the portion 51 of the ring focus with respect to reference line 54 will be equal to the angle of the target with respect to a plane including the reference line 54 and the boresight axis. The amplitude of the ring focus will increase with an increasing $\alpha$ that the target makes with the boresight axis. While the phase of the off-boresight focal ring will tell the missile in which direction to go the amplitude can be utilized to govern the response of the missile by a proportional reflection of the missile's control vanes.

Figure 14:
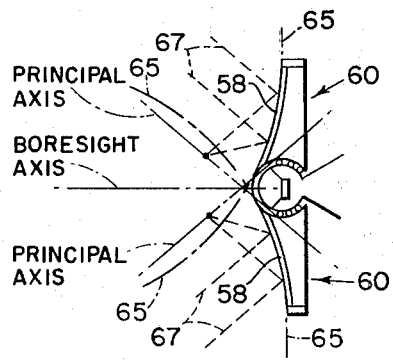
FIG. 14 shows how the collecting surface of FIG. 13 is generated.
Figure 13:
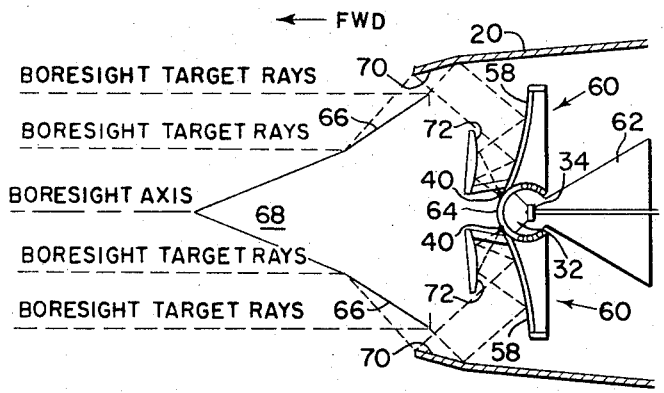
FIG. 13 is a side view of another embodiment of the invention, shown partly in cross section.

FIG. 13 illustrates another embodiment of the invention showing a modified collector having an annular reflecting surface 58 mounted on a gyroscope mass 60, the latter being mounted by ball bearings on a monoball support 62. A modified chopper 64 is also mounted on the gyroscope mass 60 so that the collector and the chopper both rotate with the gyroscope mass. The gyroscope mass is positioned with its spin axis axially aligned with the boresight axis. The generation of the shape of the collector of FIG. 13 is illustrated in FIG. 14. As shown in FIG. 14 the generation of the annular reflecting surface 58 of the collector is accomplished by rotating a sector of a parabola 65 about the gyro spin axis (or the boresight axis), the principal axis of the parabola being parallel to incoming rays 67 to the collector surface from a target on the boresight axis and intersecting a predetermined focus which is laterally offset from the boresight axis. A collector with such a configuration will reflect radiant energy received from a target source to a ring focus. FIG. 13 illustrates an on-boresight axis target condition in which the target rays are reflected from a conical annular surface 66 of a nose cone 68 to an inner annular reflecting surface 70 on the missile body 20 where the target rays are directed to the annular reflecting surface 58 of the collector. An annular secondary mirror 72 is mounted on the gyroscope mass 60 forward of the collector so as to reflect the rays aft prior to their being formed into a ring focus. Accordingly the rays are focused into a focal ring aft of the mirror 72 with all points along the ring focused on an exterior surface of the modified chopper 64. The sensor 34 is mounted contiguous to the field lens 32 similarly to that as described in the first embodiment.

Figure 15:
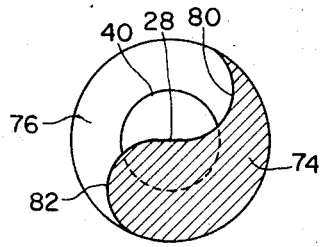
FIGS. 15 through 17 show a plan view of various types of choppers that can be employed in the embodiment of FIG. 13.
Figure 15:
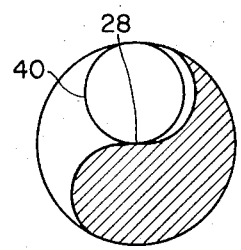
Figure 16:
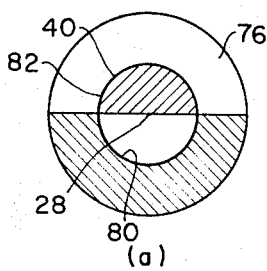
Figure 16:
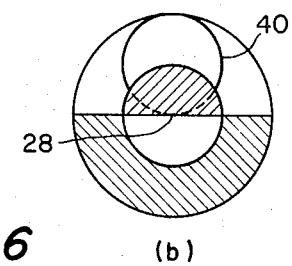
Figure 17:
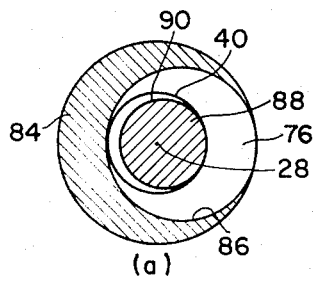
Figure 17:
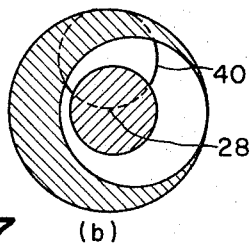

The chopper can take several different forms as shown in FIGS. 15 through 17, each of these forms modulating the ring focus in a different manner. These figures represent an end view of the chopper as seen looking aft along the boresight axis. Each of the choppers has a spherical surface of transparent material and has at least one opaque portion 74 and at least one transparent portion 76. The opaque portion 74 may be constructed by placing a silver coating on the exterior surface of the transparent. The (a) parts of each of FIGS. 15 through 17 each illustrates a ring focus for an on-boresight target condition while the (b) parts of these same figures each illustrates a ring focus which is offset from the boresight axis by a distance equal to the ring's radius. In each of the modified choppers as shown in FIGS. 15 through 17, the demarcation between the opaque portion and the transparent portion forms a chopping edge. The chopping edge for the modified chopper in FIG. 15 has a concave portion 80 and a convex portion 82, each of these portions diametrically opposing the other with respect to the boresight axis. Each of these portions 80 and 82 conform to the offset focal ring shown in FIG. 15(b), this ring being offset by its own radius from the boresight axis. Accordingly, for this embodiment of the chopper there will be 100% modulation of the rays from the ring to the sensor when the ring is offset as shown in FIG. 15(b). It is to be understood that while only one clear and one opaque portion is shown in the embodiment in FIG. 15 there may be a plurality of each giving a multi-blade pinwheel configuration which increases the modulation frequency for the same chopper spin rate. The chopper as shown in FIG. 16 has a chopping edge which is also divided into a concave portion 80 and a convex portion 82. Each of these portions diametrically oppose each other with respect to the boresight axis and each conforms in shape to a periphery of a ring for an on-boresight axis target as shown in FIG. 16(a). This chopper differs from the chopper shown in FIG. 15 in that in the former the conformance of the chopping edge to the ring is for an on-axis boresight target condition rather than an off-axis boresight target condition. The chopper as shown in FIG. 16 will give a modulation approaching 100% of the rays from the focal ring when the ring or the target is laterally offset from the boresight axis an infinitesimal lateral distance. The chopper as shown in FIG. 17 has two opaque portions thus forming two chopping edges. The chopper as shown in FIG. 17 includes an outer opaque portion 84 having a concave circular chopping edge 86 and an inner opaque portion 88 having a convex circular chopping edge 90. The convex circular chopping edge 90 is spaced at all points from the concave circular chopping edge 86 and each of the chopping edges has a center which is laterally offset from the boresight axis 28. Further, the centers of each of the chopping edges are eccentrically positioned with respect to one another. Each of the chopping edges 86 and 90 has one point which coincides with a respective point on a ring focus for an on-axis target as shown in FIG. 17(a), the points of coincidence on the focal ring diametrically opposing one another. The modulation characteristics of the chopper shown in FIG. 17 is a near 100% modulation when the ring focus is laterally offset from the boresight axis by its own radius.

The circuitry following the sensor stage of the embodiment shown in FIG. 13 can be similar to that as described for the embodiment in FIG. 1 (see FIG. 7 for this circuitry). However, in addition it is contemplated that a signal from the phase discriminator would be fed to a gyro precessor which would in turn precess the gyro mass 60 so that its spin axis would continuously tend to align on the target.

Figure 18:
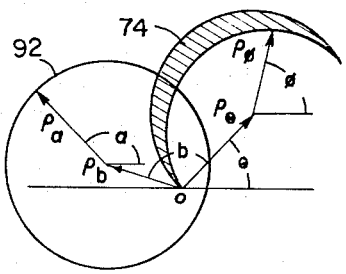
FIG. 18 shows modulation properties of a given ring focus and a given chopper.

The modulation characteristics of the choppers shown in FIGS. 15 through 17 can be found mathematically by reference to FIG. 18 wherein there is shown a ring image 92 and opaque portion 74. Referring to FIG. 18, the vector quantities and angles shown are defined as follows:

Vectors:
$P_n a \equiv$ image ring center to point on circumference
$P_n b \equiv$ axis to image ring center
$P_n \phi \equiv$ curvature center to edge of chopper
$P_n \theta \equiv$ axis to shutter center of curvature Magnitudes:
$a, b, \theta, \phi \equiv$ direction angles of $Pa, Pb, P\theta, P\phi$
$u =$ fraction of radiation transmitted
$v =$ number of image-edge intersections
$S =$ number indicating chopper edge
$X =$ number of chopper blades (sections)
$w =$ angular velocity of chopper
$M =$ modulation The equations for determining the various modulations of the choppers are as follows:

Basic Relations:

$$P_n a + P_n b = P_n \theta + P_n \phi \text{ in polar form}$$

$$Rae^{ja} + Rbe^{jb} = R\theta e^{j\theta} + R\phi e^{j\phi}$$

$$u = \frac{1}{2\pi} \sum^{v} |a_S - a_{S-1}|$$

$$S = 2, 4, 6$$

$$\theta = wt - S\frac{\pi}{X}$$

$$M = u(\theta)_{\max} - u(\theta)_{\min}, \; 0 \leq \theta \leq 2\pi$$

It is now apparent that the present invention overcomes the disadvantages of a guidance system which focuses radiant energy from a target to a point image. Of particular importance the present invention is compatible with the aerodynamic requirements of high speed vehicles in that there is no drag penalty by keeping the collector and a diffuser separated from one another. Further, by focusing radiant energy from the target into a ring image rather than a point image innumerable modulation techniques can be employed to attain a new class of modulation characteristics.

Obviously many modifications and variations of the present invention are possible in the light of the above teachings. It is therefore to be understood that within the scope of the appended claims the invention may be practiced otherwise than as specifically described.

I claim:

1. In a guidance system responsive to radiant energy from a target source, means for focusing rays of radiant energy from the target source into a focal ring about a boresight axis of the guidance system so that a lateral movement of the target source with respect to the boresight axis and the direction of the lateral movement around the boresight axis will be indicated by a proportional lateral movement of the ring with respect to the same axis which is directed in the same direction as the target's lateral movement, and means for chopping the rays at the ring according to a predetermined pattern whereby rays passing the chopper form a modulated beam indicating target movement characteristics needed for guidance, the focal ring being circular when the target is on the boresight axis and the chopping means, as seen in a plane parallel to the ring for an on-axis target, being divided into two parts by one continuous chopping edge, the edge having two equal portions diametrically opposing each other with respect to the boresight axis with one portion of the edge being convex and the other portion being concave, each of these portions conforming in shape to the periphery of the ring when the ring is offset by its own radius from the boresight axis, whereby there is one hundred percent modulation of rays from the ring when the ring is offset by its own radius from the boresight axis.

2. In a guidance system responsive to radiant energy from a target source, means for focusing rays of radiant energy from the target source into a focal ring about the boresight axis of the guidance system so that a lateral movement of the target source with respect to the boresight axis and the direction of the lateral movement around the boresight axis will be indicated by a proportioned lateral movement of the rays with respect to the same axis which extends in the same direction as the target's lateral movement, and means for chopping the rays at the ring according to a predetermined pattern, whereby rays passing the chopper form a modulated beam indicating target movement characteristics needed for guidance, and wherein the focal ring is circular when the target is on the boresight axis and the chopping means includes a conical surface rotatably mounted on the boresight axis with a principal axis of the surface aligned parallel with said boresight axis, with the conical surface converging toward the target and intersecting the entire ring and with the conical surface at the intersection of the surface and the ring normal to principal rays from the target, the conical surface having a portion extending past a ring of a target on the boresight axis and this portion terminating in and forming a part of a chopping edge and a remainder of the chopping edge having at least one point which coincides with a point on said latter ring.

3. A device as claimed in claim 2 wherein the chopping edge forms a diverging end of the conical surface and said principal axis of the conical surface is axially aligned with the boresight axis.

4. A device as claimed in claim 2 wherein the chopping edge forms a diverging end of the conical surface and said principal axis of the conical surface is laterally offset from the boresight axis.

5. A device as claimed in claim 2 wherein the chopping edge forms a converging end of the conical surface and said principal axis of the conical surface is axially aligned with the boresight axis.

6. A device as claimed in claim 2 wherein the chopping edge forms a converging end of the conical surface and said principal axis is laterally offset from the boresight axis.

7. In a guidance system including a collector for focusing rays of radiant energy from a target source on a rotatable chopper, a sensor, converting the rays passed by the chopper into electrical target signals and a phase discriminator producing a command signal after comparing the target signal with a reference signal; the improvement comprising a collector having an annular reflecting surface which is generated by rotating a curved surface about a boresight axis so that the reflecting surface focuses rays from the target to a ring about said boresight axis and the chopper including at least one chopping portion which radially increases in total area from the chopper's axis of rotation by a function greater than one so that the rays passing the chopper are modulated in varying degrees depending upon the position of the ring with respect to said boresight axis.

8. A device as claimed in claim 7 wherein the curved surface is a sector of a parabola and the boresight axis is offset toward the sector a predetermined distance from a principal axis of the parabola.

9. In a missile guidance system including a gyroscope mounted in a missile and having a mass spinning about an axis, an annular reflecting surface rotating with the gyroscope mass for focusing rays of radiant energy from a target source on a chopper, the chopper mounted for rotation with the gyroscope mass and passing a modulated beam of rays to a sensor, the sensor being fixedly mounted on a longitudinal axis of the missile and coupled to a means for precessing the gyro so as to align the gyro's spin axis on the target source and coupled to a means for driving control vanes of the missile so as to align the missile's longitudinal axis on said target source; the improvement comprising the reflecting surface being a surface generated by rotating a curved surface about the gyro's spin axis so that rays reflected by the surface are focused into a ring, the ring being axially aligned with the spin axis when the spin axis is aligned on the target source and the chopper including at least one chopping edge which is circular in shape so that the rays passing the chopper are modulated in varying degrees depending upon the displacement of the ring axis from the spin axis.

10. A device as claimed in claim 9 wherein said curved surface is a sector of a parabola and the rotation for generation of the collector surface is with the principal axis of the parabola parallel to incoming rays to the collector surface from a target on the missile's longitudinal axis and with the principal axis of the parabola intersecting a predetermined focus which focus is laterally offset from the boresight axis.

11. In an airborne guidance system responsive to radiant energy from a target source located in a seeing space forward of the guidance system, a radiant energy collector having an annular reflecting surface fixed in relationship to a boresight axis to face toward said seeing space, said annular reflecting surface conforming to a transverse section of an inner side of a parabolic surface generated by a rotation of a parabola about the boresight axis, which axis is offset from and parallel to a principal axis of the parabola so that when the reflecting surface is facing toward a target located on the boresight axis within said seeing space, radiant energy from the target will be focused by the collector into a boresight ring encircling the boresight axis within a plane normal to the boresight axis and aft of said reflector and so that a target laterally offset from the boresight axis within the seeing space will be focused by the collector into an off-boresight ring about the boresight axis with a center of the latter ring laterally offset from the boresight axis an amount proportional to the offset of the target from said boresight axis, the latter ring being within a plane tilted from a normal to the boresight axis and aft of said reflector, a portion of the off boresight ring being further from the boresight axis than a boresight ring, the degree that this portion extends beyond a boresight ring representing amplitude and being proportional to an angle that a line from the off boresight target to the center of the off boresight ring makes with the boresight axis, said portion having an angular location from a first reference line radially extending from the boresight axis, the degree of this angle from the said first reference line being equal to an angular location of the target source from a second reference line radially extending from the boresight axis in a plane including the said first reference line and the boresight axis, a chopper having an outer conical surface rotatably mounted with a principal axis of the surface coinciding with the boresight axis and the surface converging in a forward direction, the chopper being positioned at a location along the boresight axis where all of the rays in a boresight ring are normal to the conical surface, the chopper having a base lying in a plane which is offset from a normal plane to the principal axis of the conical surface, one point on said base coinciding with a point on the boresight ring and all other points on the base lying aft of the boresight ring and further from the boresight axis than the points along the boresight ring so that all points along the base of the cone lying aft of the boresight ring form a chopping edge, the chopping edge upon rotation of the chopper cone alternately and progressively chopping the portion of an off boresight ring representing amplitude, so that rays directed aft from the portion form a modulated beam, a radiant energy sensor located on the boresight axis and aft of the ring so as to pick up the modulated beam and convert the beam to usable electrical signals.

12. In a device for ascertaining the location of a source of radiant energy with respect to an axis of symmetry of such device, the combination of:

means for converging rays of radiant energy from said source into a focal ring about the said axis of symmetry of said device, the center of said focal ring lying on the said axis of symmetry when such axis passes through said source, the said focal ring being developed in a plane which extends essentially normal to said axis;

whereby a radial displacement of said source with respect to said axis results to a corresponding displacement of said focal ring with respect to said axis, the direction of such displacement of said focal ring being indicative of the direction of displacement of said source; and a modulator for interrupting the radiant energy rays of said ring according to a predetermined pattern, whereby the rays emerging from said modulator are in the form of a beam the characteristics of which are representative of the direction and extent of displacement of the focal ring from the said axis of symmetry of said device;

said modulator being of essentially planar configuration and lying in a plane which lies both normal to the said axis of symmetry of said device and also parallel to the plane in which the said focal ring is developed when the said radiant energy source lies on said axis;

said modulator being designed for rotation about said axis and acting to chop the radiant energy rays of said focal ring during each cycle of rotation thereof, said modulator being divided into parts by at least one continuous chopping edge, each such edge having two equal portions diametrically opposing one another with respect to the particular axis of symmetry, with one portion being convex and the other portion being concave, and with each portion conforming in configuration to the periphery of said focal ring when such ring is offset by its own radius from the said axis of symmetry;

whereby, when such ring is offset from the said axis of symmetry by its own radius, there is a full and complete modulation of the radiant energy rays thereof as they are acted upon by the said chopping edge, the degree of modulation of the said radiant energy rays of said ring being a function of the distance by which said focal ring is offset from the axis of symmetry of said device and also of the direction in which said focal ring is so offset.

13. In a device for determining the location of a source of radiant energy rays with respect to an axis of symmetry of said device, the combination of:

means for collecting rays emanated by said source so that the rays so collected form a ring the outer periphery of which is of circular form, the center of such ring coinciding with the axis of symmetry of said device when said source also coincides with said axis of symmetry, the center of such ring being displaced from the axis of symmetry of said device when said source is so displaced and with the amount and direction of displacement of said ring being representative of the amount and displacement of said source;

means for modulating the radiant energy rays of said ring, said modulator being in the form of a chopper which is designed to rotate about the said axis of symmetry of said device;

said chopper being of planar configuration and lying in a plane parallel to the plane of the said focal ring when the center of the latter lies on the said axis of symmetry;

said chopper including at least one chopping portion which increases radially in total area from the said axis of rotation of the chopper by a function greater than one;

whereby the radiant energy rays of said ring are modulated by said chopper by varying amounts depending upon the relative position of said focal ring with respect to the said axis of symmetry as the said source correspondingly changes in location with respect to the said axis of symmetry.

14. Means for determining the amount and direction by which a source of radiant energy is displaced from a given axis, such amount and direction of displacement being represented by the characteristics of a beam of rays emanated from said source, said means comprising:

means for bringing a portion of the radiant energy rays emanated by said source into a ring the center of which ring lies on said axis when said source also lies on said axis, with said ring being displaced from said axis upon a displacement of said source, the displacement of said ring being in a plane which extends normal to said axis, the amount of lateral displacement of such ring being proportional to the amount by which said source is displaced;

means for interrupting the radiant energy rays of said focal ring so as to develop a modulated beam therefrom, said interrupting means being in the form of a chopping device through which the radiant energy rays of said ring are designed to pass, said chopping means being in the form of a conical surface of revolution symmetrical about the axis of symmetry of said interrupting means, such conical surface converging toward said source and intersecting the entire focal ring so that such conical surface, at the intersection thereof with said ring, lies normal to the principal rays of energy reaching said conical surface from said source, said conical surface having a portion extending past said ring and terminating in, and forming a part of, a chopping edge, the remainder of such chopping edge having at least one point which coincides with a point on said focal ring.

References Cited
UNITED STATES PATENTS

| | | | |
|---|---|---|---|
| 2,378,744 | 6/1945 | Annen | 244—14 |
| 2,431,510 | 11/1947 | Salinger | 244—14 |
| 2,457,393 | 12/1948 | Muffly | 244—14 |
| 2,463,362 | 3/1949 | Doll | 250—203 X |
| 3,010,677 | 11/1961 | Guthrie et al. | 102—50 X |
| 3,014,426 | 12/1961 | Smith et al. | 102—50 X |

BENJAMIN A. BORCHELT, *Primary Examiner.*

CHESTER L. JUSTUS, SAMUEL FEINBERG,
*Examiners.*

A. E. HALL, L. L. HALLACHER, V. R. PENDERGRASS, *Assistant Examiners.*